March 22, 1966     H. F. SMITH     3,241,809
PLUG COCK VALVE
Original Filed Oct. 12, 1961
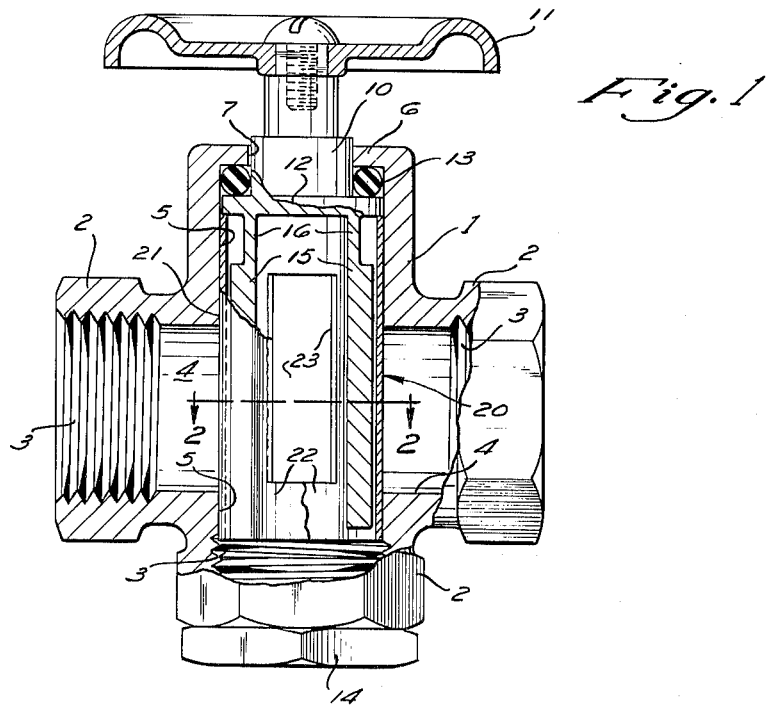
Fig. 1
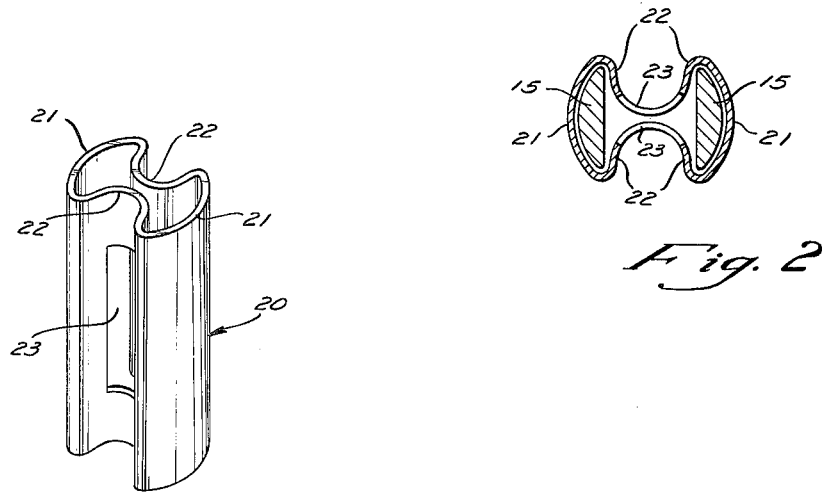
Fig. 2
Fig. 3
INVENTOR.
EDWARD M. SMITH, ADMINISTRATOR
OF THE ESTATE OF
HARRY F. SMITH, DECEASED.
BY WATTS, EDGERTON, PYLE & FISHER
B D Watts
ATTORNEYS United States Patent Office 3,241,809
Patented Mar. 22, 1966

3,241,809
PLUG COCK VALVE
Harry F. Smith, deceased, late of Lexington, Ohio, by Edward M. Smith, administrator, Lexington, Ohio, assignor to Mansfield Sanitary, Inc.
Original application Oct. 12, 1961, Ser. No. 144,797. Divided and this application Jan. 8, 1964, Ser. No. 340,585
2 Claims. (Cl. 251—182)

This application is a division of my application Serial No. 144,797, filed October 12, 1961, now abandoned.

This invention relates to the valve art and is particularly concerned with a new plug valve in which the valve body is provided with a cylindrical, valve-receiving opening or bore and in which resilient means are employed to insure fluid sealing contact of the plug unit with the cylindrical surface of the body.

Plug valves as constructed heretofore, have been provided with frusto-conical bores to receive frusto-conical plugs. Despite the well known difficulty of making good sealing engagement of two frusto-conical surfaces, these plug valves were employed because of the even greater difficulty of making sealing contact between two cylindrical surfaces and at the same time being able to rotate the plug easily. Slight axial movement of the frusto-conical plug inwardly in the body created sealing contact of the frusto-conical surfaces while similar movement in the opposite direction facilitated easy rotation of the plug but permitted leakage. Rotational movement of a cylindrical plug could not be varied by moving it axially.

The present aims are to simplify plug valve construction, to make a valve usable for the flow of fluid straight through, or at right angles through, the body and to insure against leakage of fluid without requiring such heavy contact pressure as would make rotation of the plug difficult or necessitating endwise movement of the plug to facilitate easier rotation.

This invention attains these aims by providing a valve body with a cylindrical bore or plug-receiving opening, a plug unit insertable into said bore through one end thereof and provided with two opposed, parallel, longitudinally extending fingers which are segments of a solid cylinder and between which fluid may flow when the valve is open and resilient means engaging the fingers and urging them away from each other to promote fluid sealing when the valve is closed.

The present invention will be better understood by those skilled in the art from the following specification and the accompanying drawings in which:

FIG. 1 is a central sectional view, partly in elevation, of a plug valve embodying one form of the invention;

FIG. 2 is a sectional view of the plug unit taken on line 2—2 of FIG. 1; and,

FIG. 3 is a perspective view of the tubular part of the plug unit of FIG. 1.

FIGS. 1, 2 and 3 show one form of the invention. In FIG. 1, valve body 1 is provided with three tubular projections 2 each having internal threads 3 at their outer ends for attachment of pipes or a closure plug. Two of these projections are opposed and define passages 4. Valve body 1 is also provided with a cylindrical bore or valve-receiving opening 5 which is positioned between projections 2, connects passages 4, and extends to the third projection 2 which is closed by a closure plug 14. If desired, plug 14 may be used to close any one of the three passages. At the other end of the bore 5, the body 1 has an opening 7.

The plug unit of the valve comprises a plug and a metal tube. The plug has an end 10 which is slightly smaller in diameter than that of the opening 7 in flange 6, which projects therethrough and which is provided with a plug rotating handle 11 outside of the body. The plug also includes a disc 12 which is integral with the end 10 and which is slightly smaller in diameter than bore 5. Between disc 12 and flange 6 packing 13 is disposed for the purpose of preventing escape of liquid out of the valve body through opening 7. The plug also includes two opposed, parallel, spaced apart fingers 15 which are integral with disc 10 and which constitute segments of a solid cylinder. These fingers extend longitudinally from the disc 12 to beyond the passages 4.

It will be noted that fingers 15 are connected to disc 10 by thin connectors 16. These connectors are strong enough to maintain the fingers in parallel spaced position under normal side pressures but will bend slightly to permit relative lateral movement of the fingers when liquid pressures are exerted either directly or indirectly on the sides thereof.

Resilient means in the form of a springy metal tube 20 is provided for the purpose of urging fingers 15 away from each other and promoting fluid sealing engagement in the valve body when the valve is closed. This tube surrounds the plug, has opposed, arcuate portions 21 which conform closely in curvature to the outer surfaces of the fingers 15 and to the inner cylindrical surface of the bore. Between the arcuate portions 21 of tube 20, the tube is provided with reversely curved portions 22 which are depressed within the circle on which the portions 21 lie and project toward one another between fingers 15 and lie close to, if not in actual engagement with, the edges and inner surface of fingers 15. These reversely curved portions 22 of the tube are provided with openings 23 which afford passages for fluid to flow from one passage 4 through the plug and to either of the other passages 4 when the valve is open.

It will be observed that disc 12 is slightly smaller in diameter than the cylindrical bore and that there is also slight clearance between the inner surfaces of portions 21 of tube 20 and the outer surfaces of fingers 15. As a result of these small clearances, the manufacturing tolerances for the bore, plug and resilient tube need not be kept at a low minimum in the manufacturing operations. These slight clearances also permit lateral movement of the plug under the pressure of liquid in one of the passages 4 with resultant movement of the plug and tube 20 thereby into fluid sealing engagement with the cylindrical surface of the bore around the opposed liquid passage 4. The springiness of the resilient tube 20, which is afforded in part by the reversely curved portions 22 of the tube, urges the fingers 15 away from each other and transmits some of the force of the liquid in one passage 4 to the opposite finger 15 with resultant exertion of pressure of that finger against the adjacent curved portion 21 of the tube and of that portion against the opposed wall of the bore and also supports the other finger 15 against a tendency to bend inwardly under the influence of those pressures. That tendency to bend is also offset to some extent by the liquid within the tube.

It will be understood that because of the slight clearance above mentioned, the plug unit may be readily and easily rotated in the body. When the unit is in open position, fluid may flow in the space between fingers 15 from one passage 4 to another passage 4.

It will be seen that the plug and resilient tube 20 may be assembled in the valve body simply by moving them endwise into the bore through the passage opposite opening 7 in flange 6.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A plug type valve comprising a body having a cylindrical open-ended valve-receiving bore and having fluid passages opening into opposite sides of said bore, a flange extending inwardly at one end of said bore and defining an opening of reduced diameter and means closing the other end of the bore, a plug insertable into said bore through said other end opening, said plug having a handle-receiving end portion projecting through the said flange defined opening, a disc integral with said end portion and adjacent to said flange, and opposed, parallel, spaced apart fingers constituting segments of a solid cylinder extending longitudinally from said disc to beyond said opposed passages, resilient tubular means surrounding said plug, lying close to the outer surfaces of the fingers, and having reversely curved portions projecting into the space between the fingers and provided with opposed openings for fluid to flow between said fingers when the valve is open, said reversely curved portions serving to urge the fingers away from each other and the adjacent parts of the tubular means into fluid sealing contact with the cylindrical surface of the bore when the valve is closed, and packing means around said end portion of the plug between said disc and flange.

2. A plug valve comprising a body having a cylindrical bore and opposed fluid passages opening into said bore, a plug insertable into said bore through one end thereof, means closing the said one end of the bore, and means at the opposite end of said bore through which a portion of the plug may extend, said means serving to restrain axial movement of the plug out of said bore, said plug including a disc, spaced apart fingers constituting segments of a solid cylinder extending from said disc toward said closure, thin, slightly yieldable connectors integrally connecting said disc to said fingers, a springy, thin, metal, tubular means around said plug and having portions projecting into the spaces between said fingers, said portions serving to flex said connectors and urge the fingers away from each other, and to cause the fingers to press the portions of the tubular means adjacent thereto into surface contact with the bore and thereby to promote the formation of a fluid seal about one of said fluid passages when the valve is closed.

References Cited by the Examiner

UNITED STATES PATENTS

| 2,075,459 | 3/1937 | Parker | 251—182 |
| 2,711,185 | 6/1955 | Rhodes | 251—182 X |
| 2,827,260 | 3/1958 | Jordan | 251—175 X |
| 2,845,248 | 7/1958 | Fuglie | 251—175 |

FOREIGN PATENTS 3,774  2/1908  Great Britain.

ISADOR WEIL, *Primary Examiner.*

CLARENCE R. GORDON, *Examiner.*